(12) United States Patent
Baur et al.

(10) Patent No.: US 12,467,443 B2
(45) Date of Patent: Nov. 11, 2025

(54) BEAD GASKET

(71) Applicant: Schwäbische Hüttenwerke Automotive GmbH, Aalen-Wasseralfingen (DE)

(72) Inventors: Dominik Baur, Scheer (DE); Claus Welte, Aulendorf (DE); Jochen Frey, Elchigen (DE)

(73) Assignee: SCHWÄBISCHE HÜTTENWERKE AUTOMOTIVE GMBH, Aalen-Wasseralfingen (DE)

( * ) Notice: Subject to any disclaimer, the term of this patent is extended or adjusted under 35 U.S.C. 154(b) by 408 days.

(21) Appl. No.: 16/951,488

(22) Filed: Nov. 18, 2020

(65) Prior Publication Data

US 2021/0164460 A1 Jun. 3, 2021

(30) Foreign Application Priority Data

Dec. 2, 2019 (DE) ...................... 10 2019 132 729.6

(51) Int. Cl.
*F24C 15/20* (2006.01)
*F04B 39/00* (2006.01)
(Continued)

(52) U.S. Cl.
CPC ............ *F04B 39/005* (2013.01); *F04B 53/16* (2013.01); *F04B 2205/08* (2013.01)

(58) Field of Classification Search
CPC .......................... F04B 39/005; F04B 39/0027; F04B 39/0033; F04B 39/0035; F04B 39/0038;
(Continued)

(56) References Cited

U.S. PATENT DOCUMENTS 1,851,948 A * 3/1932 Summers ............... F16J 15/122
277/606
3,050,010 A 8/1962 Thrap et al.
(Continued)

FOREIGN PATENT DOCUMENTS

CN 101368562 A 2/2009
CN 107131123 A 9/2017
(Continued)

OTHER PUBLICATIONS

German Search Report issued in German Patent Application No. 10 2019 132 729.6, dated May 27, 2020, 10 pages.
(Continued)

*Primary Examiner* — Michael J Tsai
*Assistant Examiner* — Charles W Nichols
(74) *Attorney, Agent, or Firm* — Buchanan Ingersoll & Rooney PC

(57) ABSTRACT

A bead gasket for sealing off an axial joint between a first component and a second component, the bead gasket including a first bead loop surrounds a first inner region in an axial view and includes a bead end face for an axial contact with one of the components; a passage for fluid which is located in the first inner region, wherein the first bead loop is a smallest bead loop surrounding the passage; and a first rigidifying structure which extends from the first bead loop into the first inner region in the axial view in order to rigidify the first bead loop.

20 Claims, 9 Drawing Sheets

(51) Int. Cl.
*F04B 53/16* (2006.01)
*F04D 17/08* (2006.01)
*F04D 25/06* (2006.01)
*F04D 29/42* (2006.01)
*F04D 29/70* (2006.01)

(58) Field of Classification Search
CPC .. F04B 39/0055; F04B 39/0061; F04B 53/16; F04B 2205/08; F16J 15/0818; F16J 15/085; F16J 15/0831; F04D 27/008; F04D 29/086; F04D 29/406; F04C 15/0034; F04C 25/02
USPC ........................................................ 417/312
See application file for complete search history.

(56) References Cited

U.S. PATENT DOCUMENTS

| | | | |
|---|---|---|---|
| 5,522,604 A | 6/1996 | Weiss et al. | |
| 5,775,701 A * | 7/1998 | Martini | F16J 15/0887 277/593 |
| 5,807,090 A | 9/1998 | Agner | |
| 6,098,597 A | 8/2000 | Warmoth et al. | |
| 6,131,915 A * | 10/2000 | Nicholson | F16J 15/123 277/593 |
| 6,817,847 B2 | 11/2004 | Agner | |
| 7,637,509 B2 * | 12/2009 | Du | F02M 59/02 277/637 |
| 8,257,057 B2 | 9/2012 | Yamamuro et al. | |
| 8,459,656 B2 * | 6/2013 | Ridgway | F02M 55/02 277/590 |
| 8,590,442 B2 * | 11/2013 | Iorizzo | F04B 1/0421 92/165 R |
| 10,088,048 B2 * | 10/2018 | Claus | F16L 23/003 |
| 2007/0157800 A1 * | 7/2007 | Curtis | F04B 45/04 92/98 R |
| 2010/0018915 A1 * | 1/2010 | DiPrizio | F16L 55/24 210/455 |
| 2014/0008877 A1 * | 1/2014 | Anzai | F16J 15/0818 277/590 |
| 2014/0090343 A1 * | 4/2014 | Egloff | F16J 15/0825 210/489 |
| 2014/0234150 A1 * | 8/2014 | Sugihara | F04C 2/3446 418/260 |
| 2014/0346106 A1 * | 11/2014 | Anzai | B01D 29/01 29/896.6 |
| 2016/0305428 A1 * | 10/2016 | Welte | F04C 2/3448 |
| 2017/0260979 A1 | 9/2017 | Müller et al. | |
| 2018/0372097 A1 | 12/2018 | Welte et al. | |
| 2019/0024797 A1 | 1/2019 | Yasuda | |
| 2019/0264811 A1 | 8/2019 | Claus et al. | |

FOREIGN PATENT DOCUMENTS

| | | |
|---|---|---|
| DE | 4219709 A1 | 2/1994 |
| DE | 102009010385 A1 | 9/2010 |
| DE | 102010028899 A1 | 11/2011 |
| DE | 202014005866 U1 | 7/2015 |
| EP | 2378169 A1 | 10/2011 |
| EP | 3081741 A2 | 10/2016 |
| GB | 1224265 | 3/1971 |
| WO | 0194791 A1 | 12/2001 |

OTHER PUBLICATIONS

Chinese Office Action for Chinese Application No. 202011388362.4, dated Jul. 4, 2022 with translation, 26 pages.
European Communication pursuant to Article 94(3) for European Application No. 20 209 537.8, dated Sep. 6, 2023 with translation, 8 pages.
Extended European Search Report for European Application No. 20 209 537.8, dated Apr. 26, 2021 with translation, 11 pages.

\* cited by examiner

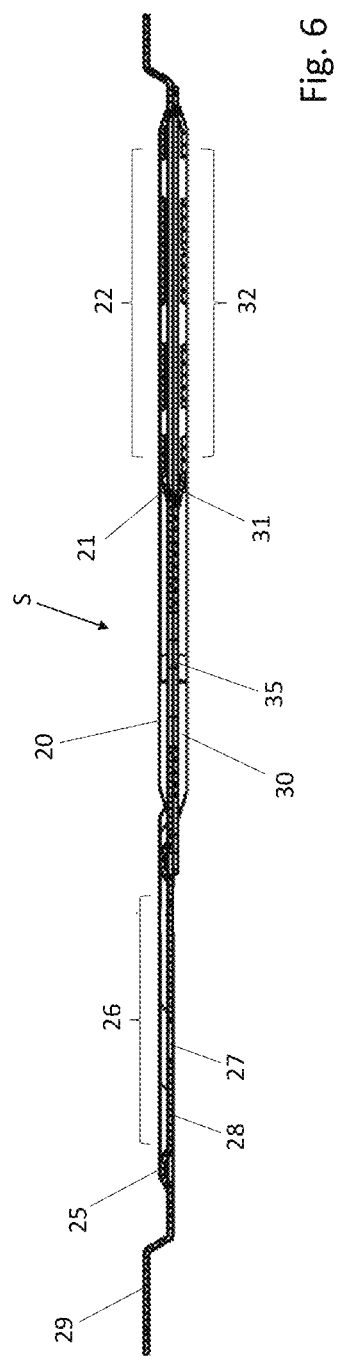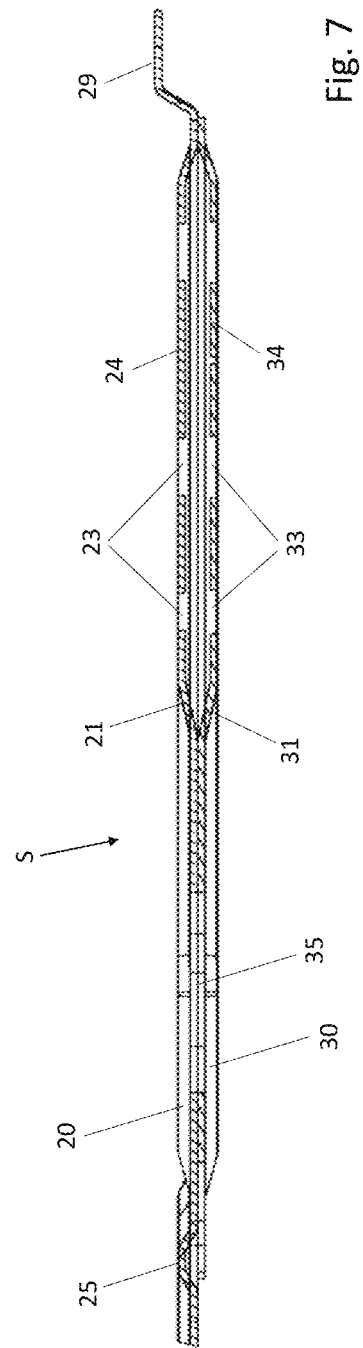

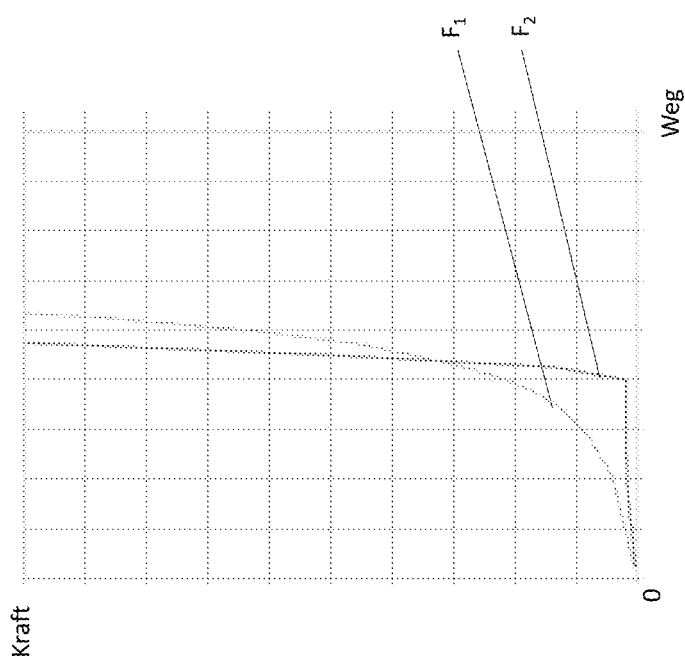

BEAD GASKET

CROSS REFERENCE TO RELATED APPLICATION

This application claims benefit of priority from German Patent Application No. 10 2019 132 729.6, filed Dec. 2, 2019. The contents of such application is incorporated herein by reference.

FIELD OF THE INVENTION

An aspect of the invention relates to a bead gasket for sealing off an axial joint between a first component and a second component. An aspect of the invention also relates to a pump, such as for example a lubricating oil pump, coolant pump, gear pump or vacuum pump, comprising a gasket for sealing off a fluid outlet or a delivery chamber of the pump. The pump can be a mono-flux or multi-flux pump, in particular a multi-circuit pump. It can be used as a gear pump for supplying a gearbox, for example an automatic gearbox or steering gearbox of a vehicle or a gearbox of a wind turbine, with pressure fluid. In another application, it can be used as a lubricant and/or coolant pump for supplying an internal combustion engine, for example a drive motor of a vehicle, with lubricant and/or coolant, in particular lubricating oil. It is likewise conceivable to use it as a combined lubricating oil pump and gear pump, in particular in embodiments in which the pump is a multi-flux pump. The pump can advantageously be embodied as a cartridge. The pump can also be used to lubricate and/or cool an electric motor which for example forms a drive motor or auxiliary drive motor of a motor vehicle. The bead gasket in accordance with an aspect of the invention can however also be used to seal off fluid connections, for example to seal off a joint between two pipe sections or conduit sections which are connected to each other.

BACKGROUND OF THE INVENTION

WO 01/94791 A1, incorporated by reference herein, discloses a pump in the form of a pump insert which is arranged in an accommodating well of an accommodating device. The pump insert is arranged axially between a base of the accommodating well and a cover of the accommodating device. When the pump is in operation, fluid is suctioned from a suction space, which extends over the outer circumference of the pump, and discharged via an end-face wall of the pump and via the base of the well. An annular sealing element, which surrounds the pump insert and acts as a radial gasket, separates the pump outlet from the suction space. A spring device, which is arranged between the base of the accommodating well and the pump insert, axially tenses the pump insert against the cover. The pump insert can be axially moved, to a minor extent, relative to the accommodating device counter to the force of the spring device, such that dimensional tolerances and changes in geometry can be compensated for. The pump comprises two working fluxes which deliver in a common pressure space, i.e. are not separated from each other. The pump is thus embodied as a multi-flux single-circuit pump.

EP 3 081 741 A2, incorporated by reference herein, discloses a gear pump comprising multiple working fluxes. The pump is embodied as a multi-circuit pump and correspondingly comprises separate pressure outlets which are sealed off from each other, with at least one pressure outlet for each flux. A first pressure outlet is sealed off by means of an annular radial gasket which surrounds a housing of the pump. An annular outlet gasket, which is arranged within the pressure space obtained by means of the radial gasket, surrounds a second pressure outlet in a seal, in order to separate the second pressure outlet from the first pressure outlet. The pump is embodied as a cartridge and is introduced into an accommodating well of an accommodating device with an outer end-face side of the pump housing first. A pressure fluid delivered by the pump is discharged via the pressure outlets and via pressure ports of the accommodating device which lie axially opposite the pressure outlets. A spring device is supported on a base of the accommodating well and presses with a spring force against the outer end-face side of the pump housing which faces axially opposite, thus enabling tolerances and changes in geometry in the axial direction to be compensated for.

US 2017/0260979 A1, incorporated by reference herein, discloses a sealing arrangement for a vane cell pump cartridge, wherein the vane cell pump comprises two working fluxes and is embodied as a dual-circuit pump. The sealing arrangement comprises: a radial gasket which is arranged such that it encircles the circumference of the pump housing and which separates a first pressure space of the pump from the suction space; and an outlet gasket which is arranged on an outer end-face side of the pump insert. The outlet gasket separates the first pressure space from a second pressure space of the pump and seals off a shaft passage for a drive shaft of the pump.

The prior art uses soft material gaskets. If the gaskets are employed as axial gaskets, it is difficult to ensure the sealing action which is based on material elasticity. The axial width of the axial joint which is sealed off by means of the axial gasket can change, for example due to temperature-induced changes in geometry and/or pressure-induced movements of the pump housing or housing parts. The joint width can also vary from installation to installation due to component tolerances and/or installation tolerances. Soft material gaskets require high surface compression which is uniform over their circumference in order to achieve the necessary seal. If the surface compression changes while the pump is in operation, due to changes in temperature and/or pressure or from pump to pump due to varying tolerances, an invariably secure sealing action can be ensured only at great effort and expense. Stability is also a problem. In the event of pulses, high pressures and large joint widths to be bridged, there is an increased risk of gap extrusion.

Metal bead gaskets have proven effective for sealing off at high temperatures and periodic changes in pressure, for example for sealing off cylinder heads. DE 42 19 709 A1, incorporated by reference herein, discloses examples of this.

SUMMARY OF THE INVENTION

An aspect of the invention is a cost-effective gasket for an axial sealing contact which can effectively and reliably (durably) compensate for component tolerances and/or installation tolerances and/or temperature-induced changes in geometry and/or pressure-induced movements of components at the location at which the gasket is installed, while maintaining the necessary sealing action.

Another aspect is to provide a pump which is suitable for arranging in an accommodating well of an accommodating device and which for this purpose comprises an end-face wall of the housing which comprises one or more pressure outlets for discharging a pressure fluid from a delivery chamber of the pump. For a pump of this type, the intention is to cost-effectively improve the seal on the one or more pressure outlets in terms of component tolerances and/or installation tolerances of the accommodating device and the pump and/or temperature-induced changes in geometry and/or pressure-induced movements of housing structures of the pump.

Yet another aspect is to provide a pump, for example a vacuum pump, which exhibits an improved housing seal.

An aspect of the invention proposes a bead gasket. The bead gasket comprises a first bead loop which surrounds a first inner region of the bead gasket in an axial view onto the bead gasket and comprises a bead end face for an axial sealing contact with one of the components, wherein the first bead loop and therefore its bead end face surrounds a passage for fluid which is located in the first inner region. In terms of the passage, the first bead loop forms a smallest bead loop surrounding the passage. This means that the passage in question is not surrounded by any bead loop which is smaller. Preferably, the first bead loop also does not surround any other bead, in particular any other bead loop, and/or any other gasket structure in the axial view. The axial direction when the bead gasket is installed is the main flow direction of the fluid through the passage.

The first bead loop is preferably a half-bead, but can alternatively also be a full bead.

The bead end face can encircle the first inner region completely over 360° in the axial view and can advantageously surround the passage with no gaps and/or interruptions. In such embodiments, the first inner region and therefore the passage is fluidically separated from the radially outer surroundings of the bead loop when in sealing contact, i.e. when installed. This is not however intended to exclude the possibility in principle of the first bead loop permitting a flow in the radial direction from the first inner region outwards or into the first inner region from without by being locally interrupted at a location or also, as applicable, at multiple locations over its circumference.

Due to the linear compression of the bead loop, a critical minimum surface compression can be maintained more effectively than when using soft material gaskets, even when the joint width changes to a comparatively significant degree. The bead gasket in accordance with an aspect of the invention is intended to be able to compensate for variations in the joint width of more than 0.1 mm and in some applications 0.2 mm or even more.

In accordance with an aspect of the invention, the bead gasket comprises a first rigidifying structure which extends from the first bead loop into the first inner region in the axial view, thereby rigidifying the first bead loop. The first rigidifying structure hinders the elastic deformation of the bead gasket in the first inner region when the axial width of the joint decreases due to altered operating conditions or from installation to installation due to tolerances. The rigidification in the first inner region improves the force/displacement characteristics of the bead gasket, such that the bead gasket in accordance with an aspect of the invention can compensate for greater variations in the axial width of the joint to be sealed off. Surface compression and/or linear compression in the sealing contact is increased as compared to a conventionally configured bead gasket with no rigidifying structures (a reference gasket). The bead gasket in accordance with an aspect of the invention counters a reduction in the joint width, within the range of variation to be expected of the joint width, with a restoring spring force which is greater than that of the reference gasket. It can advantageously be installed with a greater axial biasing force than the reference gasket.

In particular if a bead loop is formed as a half-bead, the rigidifying structure can reduce a tendency by the bead loop to fold or tilt, thus enabling a sealing contact to be more reliably ensured. The first rigidifying structure and the first bead loop are advantageously connected to each other fixedly, in particular such that they cannot be separated from each other without being destroyed, and are particularly advantageously formed integrally, wherein "integrally" is understood to mean molded in one piece and in particular homogenously formed from the same material. The first rigidifying structure and the first bead loop are preferably molded from a single blank, advantageously by reshaping the blank.

In simple embodiments, the bead gasket comprises the first bead loop only and correspondingly the first inner region only. In a further development, the bead gasket comprises another, second bead loop which surrounds a second inner region located next to the first inner region in the axial view and comprises a bead end face for an axial contact with one of the components. A passage for fluid is likewise located in the second inner region. The second bead loop can likewise be a smallest bead loop surrounding the passage of the second inner region. The bead gasket can be embodied conventionally in terms of the second bead loop or, as in preferred embodiments, can comprise a second rigidifying structure which extends from the second bead loop into the second inner region in order to rigidify the second bead loop. In terms of rigidifying the second bead loop, the statements made with respect to rigidifying the first bead loop apply analogously.

The second bead loop can be a full bead or can alternatively likewise be a half-bead.

The bead gasket can comprise two or more bead loops in an axially stacked arrangement in order to improve the spring characteristics and sealing characteristics of the bead gasket in terms of variations in the axial width of the joint. The bead gasket can in particular comprise a third bead loop which surrounds a third inner region comprising a passage for the fluid in the axial view and comprises a bead end face for an axial sealing contact with the other of the components or with yet another bead loop. The first bead loop and the third bead loop are provided relative to each other in such a way that the first inner region and the third inner region overlap in the axial view and the bead end face of the first bead loop faces axially away from the bead end face of the third bead loop and exhibits an axial distance, preferably an axial clearance.

The third bead loop is preferably a half-bead, but can instead also be a full bead. In advantageous embodiments, the first bead loop and the third bead loop are of the same type in this respect.

When the bead gasket is installed, i.e. in sealing contact, the passage in the first inner region and/or the passage in the third inner region is/are preferably sealed off from the passage in the second inner region by the first bead loop and/or the third bead loop. When the bead gasket is installed and/or in sealing contact, the passage of the first inner region and the passage of the third inner region are advantageously connected in fluid communication with each other.

With regard to the installation tolerances to be bridged and the operationally induced changes in the geometry of the axial joint to be sealed off, the bead gasket can in particular be embodied to be multi-layered in embodiments comprising a first bead loop and a third bead loop. In a multi-layered embodiment, it comprises a first gasket layer, which comprises the first bead loop, the first inner region and the first rigidifying structure, and a second gasket layer which comprises the third bead loop and the third inner region. The gasket layers lie axially one above the other. An intermediate layer or also, as applicable, multiple intermediate layers can be arranged between the first gasket layer and the second gasket layer. In preferred embodiments, however, the first gasket layer and the second gasket layer lie one immediately on top of the other. The first gasket layer preferably forms the first bead loop and the first rigidifying structure integrally.

The bead gasket can be embodied conventionally in terms of the third bead loop, such that the third inner region remains free. In preferred embodiments, however, it comprises a third rigidifying structure which extends from the third bead loop into the third inner region and rigidifies the third bead loop in this way. The second gasket layer can advantageously form the third rigidifying structure. The second gasket layer preferably forms the third bead loop and the third rigidifying structure integrally. In advantageous embodiments, the statements made with respect to the first rigidifying structure also apply to the third rigidifying structure.

The first gasket layer can comprise the second bead loop, next to the first bead loop in an axial view, preferably at a distance and thus separate from the first bead loop.

The bead gasket can comprise a fourth bead loop and optionally even more bead loops. In embodiments comprising a second bead loop and a fourth bead loop, the bead gasket can in particular be embodied to be multi-layered. The bead gasket can comprise one gasket layer, which comprises the second bead loop, and another gasket layer which comprises the fourth bead loop. The gasket layer comprising the second bead loop can in particular be the first gasket layer. The gasket layer comprising the fourth bead loop can in particular be the second gasket layer. The fourth bead loop can surround a fourth inner region comprising a passage for the fluid in the axial view and can comprise a bead end face for a sealing contact with one of the components or with yet another bead loop. The second bead loop and the fourth bead loop can be provided relative to each other in such a way that the second inner region and the fourth inner region overlap each other in the axial view. The second bead loop and the fourth bead loop can advantageously face axially away from each other and can exhibit an axial distance, preferably an axial clearance.

The fourth bead loop can be a full bead or a half-bead. In advantageous embodiments, the second bead loop and the fourth bead loop are of the same type in this respect.

Where a first bead loop, a first inner region and a first rigidifying structure are mentioned, this does not mean that the bead gasket must comprise another bead loop featuring another inner region comprising another rigidifying structure (or not). Equally, the term "third bead loop" does not presuppose that a second bead loop is provided. In first embodiments, the bead gasket in accordance with the invention can therefore comprise a single bead loop only, namely the first bead loop. In second embodiments, it can comprise two bead loops only, namely the first bead loop and either additionally the second bead loop only or additionally the third bead loop only. In third embodiments, it comprises the first bead loop, the second bead loop and the third bead loop. It can also comprise other bead loops, such as for example the fourth bead loop mentioned. The respective bead loop can be rigidified radially inwards, like the first bead loop, or can instead be embodied conventionally.

The first bead loop and any optionally additional bead loop each comprises a bead end face for an axial contact with a stay of the respective component or an optional gasket layer of the bead gasket. When it is said within the context of an aspect of the invention that the respective rigidifying structure extends from the respective bead loop into the latter's inner region in the axial view, this means that the rigidifying structure in question protrudes radially inwards beyond the stay of the respective component when the bead gasket is installed. The rigidifying structure thus impedes the flow of the fluid in the axial direction: it forms a flow resistance.

In applications in which the bead gasket serves to seal off an outlet of a lubricating oil pump, the respective rigidifying structure can advantageously act as a throttle. The throttling action of the respective rigidifying structure can be advantageous in a cold initial state of the pump, in order to relieve pressure spikes caused by an increased viscosity of the fluid when cold. Pressure spikes of this type can for example damage a filter arranged downstream of the pump.

The pump can advantageously be embodied as a vane cell pump. The sub-vane regions of the vanes can be connected to the high-pressure side of the pump in order to be able to apply the fluid of the high-pressure side to the lower sides of the vanes. In vane cell pumps comprising a sub-vane pressure supply, the first rigidifying structure and, if provided, the third rigidifying structure can be used as cold-start facilitators. Additionally or instead, the second rigidifying structure, if provided, and/or a fourth rigidifying structure, if provided, can be used as cold-start facilitators. In the cold initial state in particular, for example when cold-starting a pump, the throttling action of the respective rigidifying structure hinders the discharge of the fluid delivered, in particular oil, from the pump. The sub-vane regions are preferably attached to the high-pressure side of the pump upstream of the bead gasket. In such embodiments, the respective rigidifying structure performs an augmented throttling action due to the increase viscosity of the fluid when cold, thereby providing a particularly quick supply of pressure to the sub-vane regions when cold-starting the pump, such that during a cold start, the fluid presses the vanes outwards, even at a low rotational speed of the rotor, against a stroke contour which surrounds the rotor. The respective rigidifying structure can be configured such that the fluid delivered, when cold, is preferentially made available to the sub-vane pressure supply, and the sub-vane regions are therefore preferentially supplied with the fluid in order to press the vanes outwards against the stroke contour.

Additionally or in other applications, the respective rigidifying structure can for example be used as a filter or screen. It is also conceivable for the respective rigidifying structure to be used to even out the fluid flow.

The respective rigidifying structure can protrude slightly into the inner region from the bead loop which is to be rigidified by providing the respective rigidifying structure. It can for example elongate the bead loop radially inwards slightly, such that the respective bead loop circumferentially protrudes annularly inwards slightly, for example via the component stay onto which it is supposed to be placed.

In preferred embodiments, the respective rigidifying structure traverses the inner region of the bead loop which is to be rigidified by providing the respective rigidifying structure. In advantageous embodiments, the rigidifying structure traverses the central region of the respective inner region. The rigidifying structure, i.e. the first rigidifying structure and/or the optional second rigidifying structure and/or the optional third rigidifying structure, can for example be a connecting stay, which traverses the respective inner region, in the axial view. In developments, the respective rigidifying structure can comprise multiple connecting stays. The multiple connecting stays can for example be arranged in the shape of a star in the axial view. In other embodiments, the respective rigidifying structure is latticed, retiform or cribriform. The respective rigidifying structure can in principle also perform a filtering function, in addition to or as an alternative to its throttling function, and can form a filter or be formed by a filter.

The respective rigidifying structure can be disc-shaped, i.e. planar, or bowl-shaped, i.e. domed.

It is in principle sufficient if a single contiguous passage for the fluid is provided in the inner region of the respective bead loop. In preferred embodiments, however, multiple passages which are separated from each other are arranged in the respective inner region and together form a cross-section, through which fluid can flow, of the respective bead loop and/or the respective inner region. The respective rigidifying structure can then for example occupy more than 30% or, more preferably, the majority of the inner region surrounded by the respective bead loop and can be provided with the one passage or preferably with the multiple passages of the respective bead loop. The first rigidifying structure and/or the optional second rigidifying structure and/or the optional third rigidifying structure and/or the optional fourth rigidifying structure can in particular be repeatedly perforated, i.e. can comprise a plurality of passages for the fluid, next to each other in the axial view, which together form the cross-section which is surrounded by the respective bead loop and through which fluid can flow, i.e. the flow cross-section surrounded by the respective bead loop. The cross-sectional area, as measured in the axial view, of the inner region surrounded by the respective bead loop is advantageously at least five times or at least ten times larger than the respective individual passage of the multiple passages. The passages can in particular be round passage holes, for example circular passage holes.

The bead gasket can in particular be a metal bead gasket, thus enabling a gasket to be provided which, as compared to an elastomer gasket or an elastomer-composite gasket, is cost-effective and promotes technical cleanliness (no abrading of elastomer particles) and is reliable/durable (since there is no gap extrusion). The gasket layer(s) is/are preferably metal sheet structures.

In order to improve its micro-sealing action (roughness of the complementary surface of the respective component), the bead gasket can be coated or covered with a flexible gasket material, for example an elastomer or thermoplastic elastomer (TPE). In such embodiments, at least the first bead loop and/or at least the second bead loop, if provided, and/or at least the third bead loop, if provided, and/or at least the fourth bead loop, if provided, is/are coated or covered with the flexible gasket material on at least its/their bead end face(s). An unmodified bead gasket made only of metal, and not coated, is preferred for reasons of cleanliness and also cost.

An aspect of the invention relates to a bead gasket not only as such but also in preferred applications in which it serves to seal off a pump housing or, even more preferably, a pump outlet. An aspect of the invention also relates to a pump for applying a pressure fluid to an assembly or supplying a pressure fluid to an assembly or generating a negative pressure, wherein the pump can for example be a gear pump for supplying a gearbox with hydraulic fluid, a lubricant pump and/or coolant pump for supplying a drive motor, such as for example a combustion engine or electric motor, with lubricant and/or coolant, for example lubricating oil, or a vacuum pump for applying a negative pressure to an assembly, in particular a brake servo.

The pump comprises a pump housing featuring a circumferential wall, a first end-face wall and a second end-face wall. The circumferential wall surrounds a delivery chamber of the pump, and the end-face walls delineate the delivery chamber on its end-face sides. The pump also comprises a delivery member which can be moved in the delivery chamber in order to deliver the fluid from a low-pressure side of the pump to a high-pressure side of the pump and thence through an outlet of the pump. In accordance with an aspect of the invention, the pump comprises a bead gasket featuring at least the first bead loop. The first bead loop surrounds the outlet or the delivery chamber in the axial view and axially faces an end-face side of a sealing stay of the pump housing, in order to seal it off. When the pump is installed, the first bead loop is in an axial sealing contact on the end-face side with the sealing stay of the pump housing. Prior to installation, the first bead loop can be already in contact with the end-face side of the sealing stay of the pump housing or can still have a slight axial distance from said end-face side.

The bead gasket can comprise the first rigidifying structure. In a first application, the bead gasket serves as an outlet gasket and correspondingly surrounds the outlet or one of a plurality of outlets of the pump. In a second application, in which it serves as a housing gasket, it surrounds the delivery chamber.

If the bead gasket comprises the first bead loop and the first rigidifying structure, the first rigidifying structure overlaps with the outlet in the axial view in the application as an outlet gasket, i.e. it protrudes into the free flow cross-section of the outlet. In the application as a housing gasket, the rigidifying structure overlaps with the delivery chamber in the axial view, i.e. it protrudes radially inwards into the delivery chamber in the axial view. The pump is preferably formed as a vane cell pump. The pump can however in principle also be formed as an externally toothed wheel pump, an internally toothed wheel pump, a pendulum-slider pump, a piston pump or the like.

If the bead gasket serves as an outlet gasket, the pump is particularly suitable, not least because of the bead gasket in accordance with an aspect of the invention, for applications in which the pump housing protrudes at least partially into an accommodating well of an accommodating device, such as is for example typical in gear pumps. In such applications, the pump protrudes into the accommodating well, with the bead gasket axially first, such that the bead gasket seals off the pump outlet with respect to the base of the accommodating well. The axial joint is formed between the outer end-face side of the pump housing, on which the bead gasket is arranged, and the axially opposite base of the well.

The bead gasket can be arranged in an indirect line of force and preferably in the indirect line of force to a spring device which absorbs a larger portion of the axial forces, acting via the axial joint, than the bead gasket. In such embodiments, the bead gasket need only absorb the axial forces necessary for a secure seal in the axial sealing contact and can therefore be optimized for its actual task, namely the sealing action. The bead gasket can alternatively be arranged in the direct line of force. In such embodiments, it can form the spring device, in order to axially tense the pump into its fastening.

The pump can for example be a linear stroke pump or, more preferably, a rotary pump. As a rotary pump, it can be an external-axle pump, for example an externally toothed wheel pump, or an internal-axle pump, for example a vane cell pump, an internally toothed wheel pump or a pendulum-slider pump. The delivery member can comprise a rotor which can be rotationally moved about a rotational axis in the delivery chamber and which serves to deliver the fluid from a low-pressure side of the pump to a high-pressure side of the pump and through an outlet of the pump. The rotor can advantageously serve to form delivery cells which periodically increase and decrease in size as the rotor rotates, in order to deliver the fluid from the low-pressure side of the pump to the high-pressure side of the pump.

Features of aspects of the invention are also described in the aspects formulated below. The aspects are worded in the manner of claims and can substitute for them. Features disclosed in the aspects can also supplement and/or qualify the claims, indicate alternatives with respect to individual features and/or broaden claim features. Bracketed reference signs refer to example embodiments of the invention which are illustrated below in figures. They do not restrict the features described in the aspects to their literal sense as such, but do conversely indicate preferred ways of realizing the respective feature.

Aspect 1. A bead gasket for sealing off an axial joint between a first component (1) and a second component (15), the bead gasket (B) comprising:
   (a) a first bead loop (21) which surrounds a first inner region (22) in an axial view and comprises a bead end face for an axial contact with one of the components (1, 15);
   (b) a passage (23) for fluid which is located in the first inner region (22),
   (c) wherein the first bead loop (21) is a smallest bead loop surrounding the passage (23); and
   (d) a first rigidifying structure (24) which extends from the first bead loop (21) into the first inner region (22) in the axial view in order to rigidify the first bead loop (21).

Aspect 2. The bead gasket according to the preceding aspect, comprising:
   a second bead loop (25) which surrounds a second inner region (26) located next to the first inner region (22) in the axial view and comprises a bead end face for an axial contact with one of the components (1, 15); and
   a passage (27) for fluid which is located in the second inner region (26).

Aspect 3. The bead gasket according to the preceding aspect, comprising a second rigidifying structure (28) which extends from the second bead loop (25) into the second inner region (26) in order to rigidify the second bead loop (25).

Aspect 4. The bead gasket according to any one of the immediately preceding two aspects, wherein the second bead loop (25) is a full bead or is instead a half-bead.

Aspect 5. The bead gasket according to any one of the immediately preceding three aspects, wherein the second bead loop (25) is a smallest bead loop surrounding the passage (27) of the second inner region (26).

Aspect 6. The bead gasket according to any one of the immediately preceding four aspects, wherein the second bead loop (25) and the second rigidifying structure (28) are uniformly molded from a single blank, preferably a metal sheet, in particular a sheet of steel.

Aspect 7. The bead gasket according to any one of the preceding aspects, wherein the first bead loop (21) and the first rigidifying structure (24) are uniformly molded from a single blank, preferably a metal sheet, in particular a sheet of steel.

Aspect 8. The bead gasket according to any one of the preceding aspects in combination with Aspect 2, wherein the first bead loop (21), the second bead loop (25), the first rigidifying structure (24) and the second rigidifying structure (28) according to Aspect 3, if provided, are molded from a single blank, preferably a metal sheet, in particular a sheet of steel.

Aspect 9. The bead gasket according to any one of the preceding aspects, comprising a third bead loop (31) which surrounds a third inner region (32) comprising a passage (33) for the fluid in the axial view and comprises a bead end face for an axial contact with the other of the components (1, 15), wherein
   the first bead loop (21) and the third bead loop (31) are arranged axially one above the other, preferably one directly above the other,
   the first inner region (22) and the third inner region (32) overlap in the axial view, and
   the bead end face of the first bead loop (21) faces axially away from the bead end face of the third bead loop (31).

Aspect 10. The bead gasket according to any one of the preceding aspects, comprising:
   a first gasket layer (20) which comprises the first bead loop (21), the first inner region (22) and the first rigidifying structure (24); and
   a second gasket layer (30) comprising a third bead loop (31) which surrounds a third inner region (32) in which a passage (33) for the fluid is located,
   wherein
   the gasket layers (20, 30) lie axially one above the other, preferably one immediately on top of the other,
   the third bead loop (31) comprises a bead end face for an axial contact with the other of the components (1, 15), wherein said bead end face faces axially away from the bead end face of the first bead loop (21),
   and the first inner region (22) and the third inner region (32) overlap in the axial view.

Aspect 11. The bead gasket according to the preceding aspect in combination with Aspect 2, wherein the first gasket layer (20) comprises the second bead loop (25) and the second inner region (26).

Aspect 12. The bead gasket according to any one of the immediately preceding three aspects, comprising a third rigidifying structure (34) which extends from the third bead loop (31) into the third inner region (32) in order to rigidify the third bead loop (31).

Aspect 13. The bead gasket according to any one of the immediately preceding four aspects, wherein the first bead loop (21) and the third bead loop (31) splay axially away from each other towards the respectively surrounded inner region (22, 32) and the respective bead end face, such that an elongated axial spring displacement is obtained between these bead end faces.

Aspect 14. The bead gasket according to any one of the immediately preceding five aspects, wherein the third bead loop (31) is a smallest bead loop surrounding the passage (33) of the third inner region (32).

Aspect 15. The bead gasket according to any one of the preceding aspects, wherein the first bead loop (21) and/or the third bead loop (31) is/are a half-bead.

Aspect 16. The bead gasket according to any one of the preceding aspects, wherein the respective rigidifying structure (24, 28, 34) traverses the assigned inner region (22, 26, 32).

Aspect 17. The bead gasket according to any one of the preceding aspects, wherein the respective rigidifying structure (24, 28, 34) extends over an angle of more than 90° or more than 120° along the assigned bead loop (21, 25, 31) in the axial view.

Aspect 18. The bead gasket according to any one of the preceding aspects, wherein the respective rigidifying structure (24, 28, 34) extends over the full circumference along the assigned bead loop (21, 25, 31) in the axial view.

Aspect 19. The bead gasket according to any one of the immediately preceding two aspects, wherein the respective rigidifying structure (24, 28, 34) extends with no interruptions along the assigned bead loop (21, 25, 31) in the axial view.

Aspect 20. The bead gasket according to any one of the preceding aspects, wherein the respective rigidifying structure (24, 28, 34) is disc-shaped or bowl-shaped.

Aspect 21. The bead gasket according to any one of the preceding aspects, wherein the respective rigidifying structure (24, 28, 34) comprises multiple passages (23, 27, 33), which are separated from each other and jointly surrounded by the assigned bead loop (21, 25, 31), next to each other in an axial plan view.

Aspect 22. The bead gasket according to any one of the preceding aspects, wherein the respective rigidifying structure (24, 28, 34) fills at least 30% or at least 50% of the area of the inner region (22, 26, 32) surrounded by the assigned bead loop (21, 25, 31) in an axial plan view.

Aspect 23. The bead gasket according to any one of the preceding aspects, wherein the respective rigidifying structure (24, 28, 34) fills a majority of the cross-sectional area of the assigned inner region (22, 26, 32) in an axial plan view.

Aspect 24. The bead gasket according to any one of the preceding aspects, wherein the respective rigidifying structure (24, 28, 34) extends over at least the majority of the inner circumference of the corresponding bead loop (21, 25, 31) over a breadth, being a radial breadth in the axial view, which corresponds at least to the radial breadth of the corresponding bead loop (21, 25, 31).

Aspect 25. The bead gasket according to any one of the preceding aspects, wherein the respective rigidifying structure (24, 28, 34) has no beads.

Aspect 26. The bead gasket according to any one of the preceding aspects, wherein no other bead loop for placing onto one of the components (1, 15) extends in the respective inner region (22, 26, 32).

Aspect 27. The bead gasket according to any one of the preceding aspects, wherein the respective bead loop (21, 25, 31) does not branch.

Aspect 28. The bead gasket according to any one of the preceding aspects, wherein the bead gasket (B) is an unmodified metal bead gasket.

Aspect 29. The bead gasket according to any one of Aspects 1 to 27, wherein the respective bead loop (21, 25, 31) is coated or covered with a flexible gasket material, for example an elastomer or thermoplastic elastomer (TPE), on at least its bead end face(s), in order to improve the micro-sealing action of the bead loop in question.

Aspect 30. A pump for applying fluid to an assembly, for example a gearbox, the pump comprising:
  (a) a pump housing (1) featuring: a circumferential wall (2), which surrounds a delivery chamber (5) of the pump; and a first end-face wall (3) and second end-face wall (4) which delineate the delivery chamber (5) on its end-face sides;
  (b) an inlet (6) for the fluid on a low-pressure side of the pump housing (1) and an outlet (8) through which fluid on a high-pressure side of the pump housing (1) can be delivered out of the delivery chamber (5);
  (c) a delivery member, which can be moved in the delivery chamber (5), for delivering the fluid from the low-pressure side to the high-pressure side; and
  (d) a bead gasket (B) comprising a first bead loop (21) which surrounds a first inner region (22) of the bead gasket (B), through which the fluid can axially flow, and surrounds the outlet (8) or the delivery chamber (5) in an axial contact on the end-face side with respect to the first bead loop (21), in order to seal it off, in an axial view onto the bead gasket (B).

Aspect 31. The pump according to the preceding aspect, characterized in that the first bead loop (21) surrounds the outlet (8) only, in order to fluidically separate the outlet (8) from its surroundings.

Aspect 32. The pump according to any one of the immediately preceding two aspects, wherein the outlet (8) emerges on an outer end-face side of the first end-face wall (3) which faces away from the delivery chamber (5), and the bead gasket (B) is held on the pump housing (1) such that it axially faces the outer end-face side of the first end-face wall (3) and preferably abuts the outer end-face side of the first end-face wall (3) in axial contact, to seal off the outlet (8).

Aspect 33. The pump according to any one of the immediately preceding three aspects, wherein
  the bead gasket (B) comprises a third bead loop (31) which surrounds a third inner region (32) of the bead gasket (B), through which the fluid can flow, in the axial view, wherein
  the first inner region (22) and the third inner region (32) overlap in the axial view, and
  an outer bead end face of the first bead loop (21) which surrounds the outlet (8) axially faces the pump housing (1) and faces axially away from an outer bead end face of the third bead loop (31).

Aspect 34. The pump according to the preceding aspect, wherein the first bead loop (21) and the third bead loop (31) can be axially moved elastically towards each other.

Aspect 35. The pump according to any one of the immediately preceding two aspects, wherein the first bead loop (21) and the third bead loop (31) are half-beads which splay away from each other towards the respective inner region.

Aspect 36. The pump according to any one of the immediately preceding three aspects, wherein the pump is arranged on an accommodating device (15), the accommodating device (15) comprises an end-face wall (17), preferably the base (17) of a well, which lies axially opposite the outlet (8) and comprises a pressure port (18), and the third bead loop (31) surrounds the pressure port (18) in axial contact with the end-face wall (17) of the accommodating device (15), such that the outlet (8) is connected to the pressure port (18) in a fluid seal.

Aspect 37. The pump according to the preceding aspect, wherein the first bead loop (21) of the bead gasket (B) abuts the first end-face wall (3) of the pump housing (1) in axial contact, and the third bead loop (31) of the bead gasket (B) abuts the end-face wall (17) of the accommodating device (15) in axial contact.

Aspect 38. The pump according to any one of Aspects 30 to 37, wherein
  the pump is arranged on an accommodating device (15),
  the accommodating device (15) comprises an accommodating well (16) featuring a base (17) of the well,
  at least one axial portion of the pump housing (1) is arranged in the accommodating well (16), such that the outer end-face side of the first end-face wall (3) lies axially opposite the base (17) of the well, forming an axial joint, and
  the bead gasket (B) seals off the outlet (8) in the axial joint.

Aspect 39. The pump according to any one of Aspects 30 to 38, wherein the pump comprises a second outlet (9) for the fluid which emerges on the outer end-face side of the first end-face wall (3) of the pump housing (1), next to the outlet (8), and the bead gasket (B) comprises a second bead loop (25) which axially faces the outer end-face side of the first end-face wall (3) of the pump housing (1) and preferably abuts the outer end-face side of the first end-face wall (3) in axial contact, wherein the second bead loop (25) surrounds a second inner region (26), which is located next to the first inner region (22) and through which the fluid can axially flow, in the axial view and surrounds the second outlet (9) in an axial contact on the end-face side with respect to the first bead loop (21).

Aspect 40. The pump according to any one of Aspects 30 to 39, wherein the bead gasket (B) is subjected to an axial biasing force when the pump is initially assembled, such that it is elastically spring-deflected axially and exerts an axial spring force, corresponding to the biasing force, on the pump housing.

Aspect 41. The pump according to any one of Aspects 30 to 40, wherein when the pump is assembled, the bead gasket (B) exerts an axial spring force on the pump housing (1) via the first bead loop (21) either in an indirect line of force to a spring device (40) or in a direct line of force.

Aspect 42. The pump according to any one of Aspects 30 to 41, comprising a spring device (40) which is arranged on the pump housing (1) in order to exert a spring force which acts axially on the pump housing (1).

Aspect 43. The pump according to any one of Aspects 30 to 42, comprising a spring device (40) for exerting a spring force which acts axially on the pump housing (1), wherein the bead gasket (B) is arranged in an indirect line of force to the spring device (40).

Aspect 44. The pump according to any one of Aspects 30 to 43, wherein the bead gasket (B) is arranged in a direct line of force, preferably on the pump housing (1), in order to exert a spring force which acts axially on the pump housing (1).

Aspect 45. The pump according to Aspect 30, wherein the first end-face wall forms a housing cover, and the bead gasket for sealing off the delivery chamber is arranged between the circumferential wall and the first end-face wall.

Aspect 46. The pump according to any one of Aspects 30 to 45, wherein the delivery member (10) is a rotor (10), which can be rotationally moved about a rotational axis (R), for forming delivery cells which periodically increase and decrease in size as the rotor (10) rotates, in order to deliver the fluid, wherein the axial direction of the first bead loop (21) is preferably parallel to the rotational axis (R) of the delivery member (10).

Aspect 47. The pump according to any one of Aspects 30 to 46, wherein the pump is a gear pump and/or a lubricant pump and/or coolant pump or a vacuum pump for a motor vehicle or a gear pump for a device for generating energy, for example a wind turbine.

Aspect 48. The pump according to any one of Aspects 30 to 47, wherein the pump is a multi-flux pump and comprises a first outlet (8) and a second outlet (9), wherein the first outlet (8) emerges on an outer end-face side of the first end-face wall (3) of the pump housing (1).

Aspect 49. The pump according to the preceding aspect, wherein the second outlet (9) emerges on the outer end-face side of the first end-face wall (3), next to the first outlet (8).

Aspect 50. The pump according to any one of the immediately preceding two aspects, wherein the bead gasket (B) separates the first outlet (8) from the second outlet (9), and the pump is a multi-circuit pump.

Aspect 51. The pump according to any one of Aspects 30 to 50, characterized in that the bead gasket (B) is a bead gasket (B) according to any one of Aspects 1 to 28, wherein the first rigidifying structure (24) which seals off the outlet (8) overlaps with the outlet (8) in the axial view, and the first rigidifying structure (24) which seals off the delivery chamber (5) overlaps with the delivery chamber (5) in the axial view, such that the fluid flows onto the first rigidifying structure (24) when the pump is in operation.

Aspect 52. The pump according to the preceding aspect in combination with Aspect 9 or 10, wherein the third rigidifying structure (34) which seals off the outlet (8) again overlaps with the outlet (8) in the axial view, and the third rigidifying structure (34) which seals off the delivery chamber (5) again overlaps with the delivery chamber (5) in the axial view, such that the fluid flows successively onto the first rigidifying structure (24) and third rigidifying structure (34) when the pump is in operation.

BRIEF DESCRIPTION OF THE DRAWINGS

An example embodiment of the invention is explained below on the basis of figures. Features disclosed by the example embodiment, each individually and in any combination of features, advantageously develops the subject-matter of the claims, the aspects and the embodiments also described above. There is shown:

FIG. 6 the bead gasket in a longitudinal section;

FIG. 7 a region of the bead gasket in the longitudinal section of FIG. 6;

FIG. 11 a force/displacement diagram for the rigidified bead gasket as compared to a non-rigidified bead gasket (a reference gasket).

DETAILED DESCRIPTION OF THE INVENTION

Figure 1:
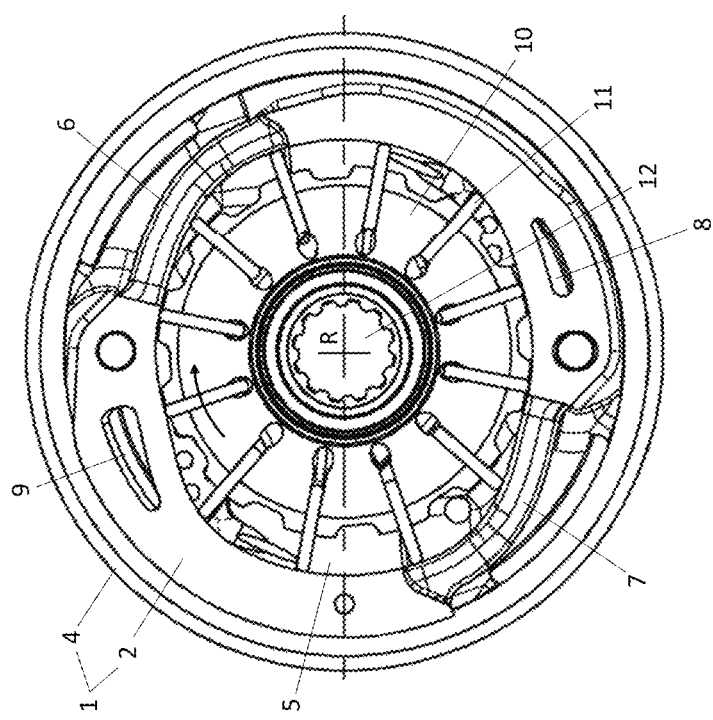
FIG. 1 a pump in an axial view onto a delivery chamber of the pump.

FIG. 1 shows a pump in an axial view onto a pump housing 1. A delivery chamber 5 is formed in the pump housing 1. The pump housing 1 comprises a circumferential wall 2, which surrounds the delivery chamber 5, and end-face walls which axially delineate the delivery chamber 5 on its two end-face sides and of which one end-face wall 4 can be seen. The other of the end-face walls has been removed in FIG. 1, such that there is an unobstructed view into the delivery chamber 5.

The pump is embodied as a rotary pump and comprises a rotor 10, which can be rotated about a rotational axis R, and multiple vanes which are guided such that they can be moved radially or at least substantially in the radial direction in slots in the rotor 10, as is typical in vane cell pumps. The rotor 10 and the vanes 11 together form an impeller of the pump. An inner circumference of the circumferential wall 2 comprises a guiding surface for the vanes 11. As the rotor 10 rotates, the vanes 11 are pressed outwards against the guiding surface of the circumferential wall 2. As the rotor 10 rotates, the guiding surface determines how far the vanes 11 protrude beyond the outer circumference of the rotor 10. In the circumferential direction, the vanes 11 delineate delivery cells formed in the delivery chamber 5. The profile of the guiding surface of the circumferential wall 2 is selected such that as the rotor 10 rotates, the delivery cells periodically increase in size on a low-pressure side of the delivery chamber 5 and decrease in size again on a high-pressure side of the delivery chamber 5 in order to expel a fluid, which flows into the delivery chamber 5 through an inlet on the low-pressure side of the delivery chamber 5, at an increased pressure as a pressure fluid through a pressure outlet situated on the high-pressure side of the delivery chamber 5. In advantageous embodiments, the pump is designed to suction the fluid through the inlet, for example against the force of gravity.

The pump is a multi-flux pump—in the example embodiment, a dual-flux pump, i.e. it comprises a first working flux and a second working flux. The delivery chamber 5 correspondingly comprises a first inlet 6 and a first pressure outlet for the first working flux and a second inlet 7 and a second pressure outlet for the second working flux. When the pump is in operation, the rotor 10 rotates clockwise in FIG. 1, as indicated by a rotational direction arrow. The pressure outlets are arranged in the end-face wall which is not shown in FIG. 1. A first connecting channel which extends axially through the circumferential wall 2 on the high-pressure side of the first working flux is denoted by 8, and a second connecting channel which extends axially through the circumferential wall 2 on the high-pressure side of the second working flux is denoted by 9. The connecting channels 8 and 9 connect pressure spaces, formed in the region of the end-face wall 4, to the pressure outlets of the axially opposite end-face wall of the pump housing 1, which is not shown in FIG. 1.

Figure 2:
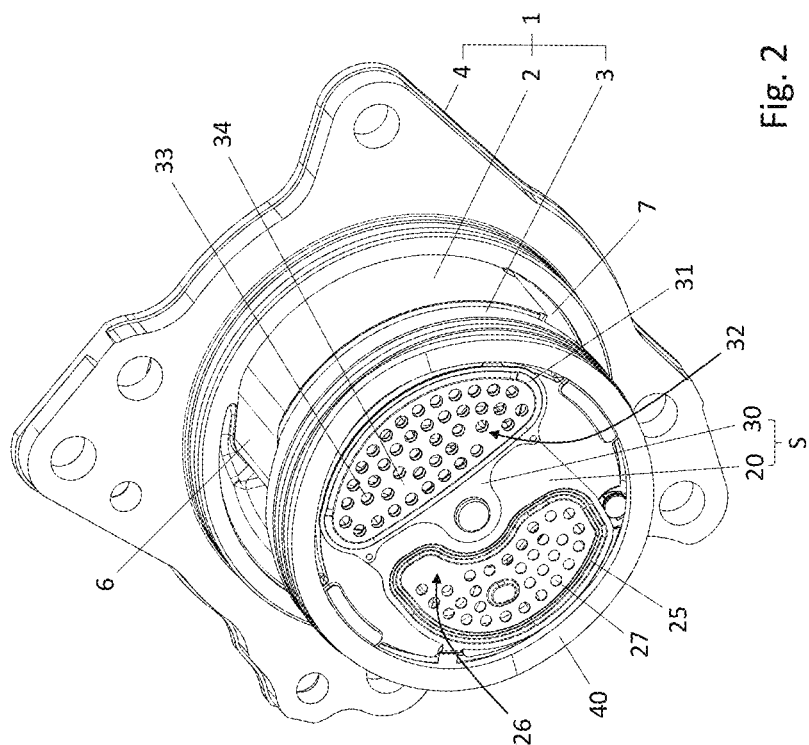
FIG. 2 the pump in an isometric view onto an end-face side on which a bead gasket in accordance with an aspect of the invention is arranged.

FIG. 2 shows the pump pre-assembled, in an isometric view onto an outlet side of the pump on the end-face side. The outlet side is formed on an outer end-face side of the first end-face wall 3 which is not shown in FIG. 1 but can be seen in FIG. 2. An outlet gasket in the form of a bead gasket B, which is arranged on the outer end-face side of the end-face wall 3, covers the pressure outlets when the pump is pre-assembled. The first pressure outlet and the second pressure outlet emerge on the outer end-face side of the end-face wall 3. The connecting channels 8 and 9 which can be seen in FIG. 1 are assigned to the pressure outlets, wherein the connecting channel 8 emerges into the first pressure outlet which leads through the end-face wall 3, and the connecting channel 9 emerges into the second pressure outlet which likewise leads through the end-face wall 3.

The bead gasket B comprises multiple bead loops which each encircle an inner region of the bead gasket B in the form of a bead loop. A bead loop 25 and a bead loop 31 can be seen in FIG. 2. The bead loop 31 surrounds an inner region 32 of the bead gasket B which lies axially opposite the first pressure outlet and overlaps with it in an axial view. The bead loop 25 surrounds an inner region 26 of the bead gasket B which lies axially opposite the second pressure outlet and overlaps with it in an axial view.

The pump also comprises a spring device 40 which is formed by way of example as a corrugated annular spring. The spring device 40 is likewise arranged on the outer end-face side of the end-face wall 3. It exerts an axial spring force on the pump housing 1 when the pump is installed.

The circumferential wall 2 forms a closed ring, while each of the end-face walls 3 and 4 is plate-shaped. In a first angular range over which the low-pressure side of the first working flux extends, the circumferential wall 2 comprises a cavity on each of its two end-face sides, in order to form the first inlet 6. In another angular range, over which the low-pressure side of the second working flux extends, the circumferential wall 2 also comprises a second cavity on each of its two end-face sides, in order to form the second inlet 7. The fluid can flow into the delivery chamber 5 (FIG. 1) via the cavities on the end-face side of the circumferential wall 2, i.e. via the first inlet 6 and the second inlet 7. The circumferential wall 2 also comprises a cavity on its outer circumference in each of the angular range of the inlet 6 and the angular range of the inlet 7. The cavities on the circumference each extend axially from one cavity on the end-face side to the axially opposite other cavity on the end-face side. The cavities on the circumference connect the two cavities of the first inlet 6 on the end-face side and, on the opposite side, the two cavities of the first inlet 7 on the end-face side, such that a comparatively large-volume first inlet 6 and an equally large-volume second inlet 7 are obtained. The end-face walls 3 and 4 can each be provided with assigned cavities in order to increase the flow cross-section of the inlet 6 and the flow cross-section of the inlet 7.

Figure 3:
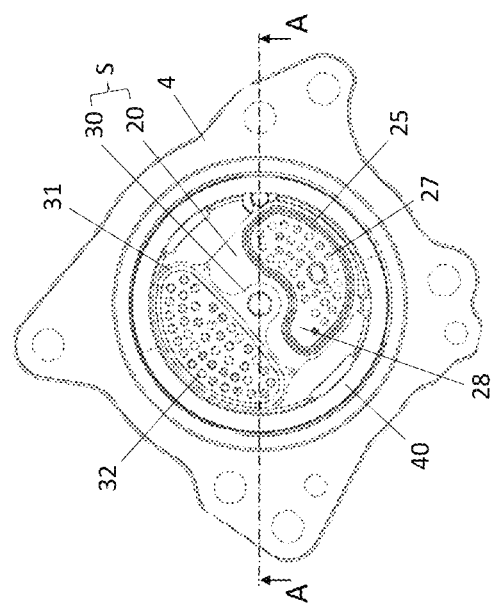
FIG. 3 the pump in an axial view onto the bead gasket.

FIG. 3 shows the pump in an axial view onto the bead gasket B. As already mentioned, the bead gasket B comprises the bead loop 31, which encircles the first pressure outlet in the axial view, and the bead loop 25 which encircles the second pressure outlet in the axial view.

FIGS. 2 and 3 show the end-face wall 4 comprising a flange which serves the purpose of assembling the pump. For simplicity, this flange is not shown in the axial view in FIG. 1.

Figure 4:
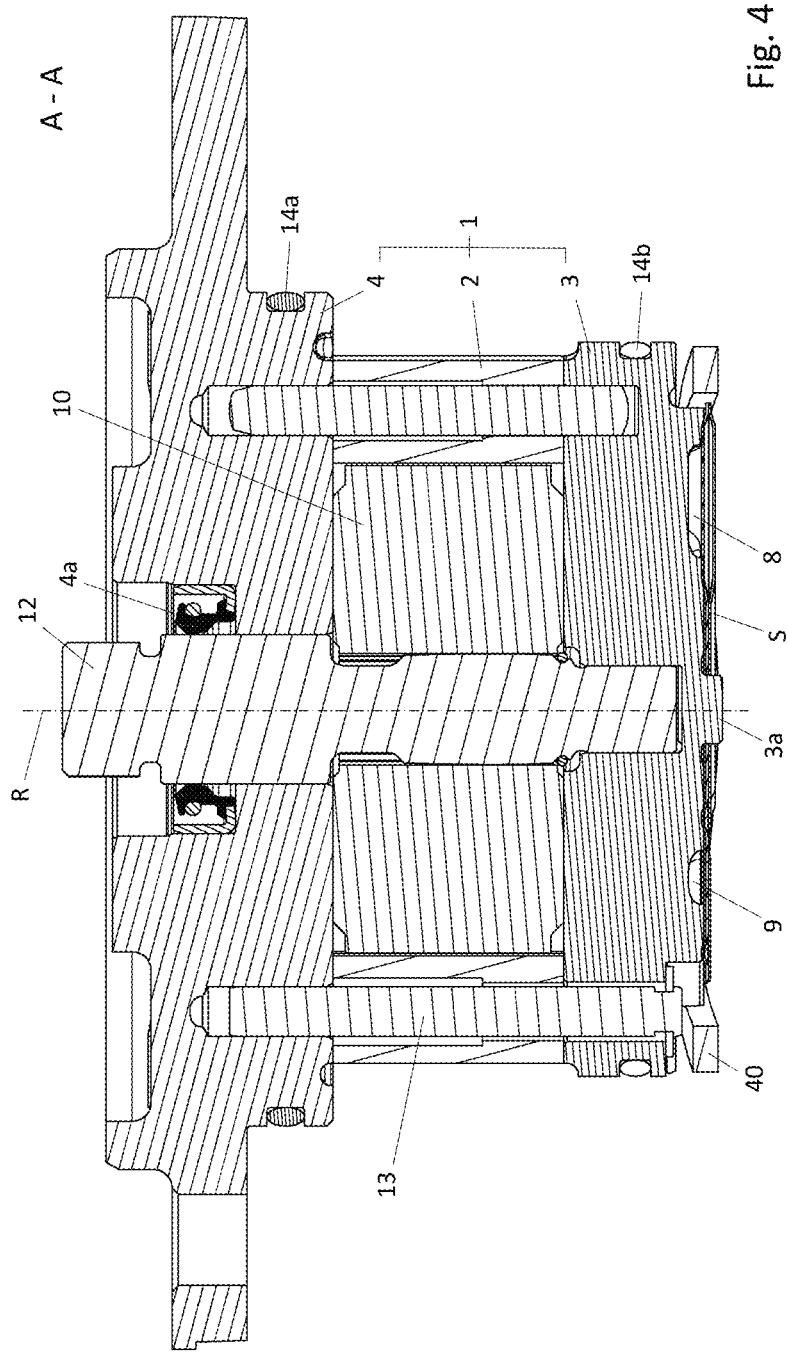
FIG. 4 the pump in a longitudinal section.

FIG. 4 shows the pump pre-assembled, in the longitudinal section A-A indicated in FIG. 3. The pump housing 1 comprises the wall structures which have already been mentioned, namely the circumferential wall 2, the first end-face wall 3 and the second end-face wall 4 which together delineate the delivery chamber 5 (FIG. 1) over its circumference and axially on its end-face sides. Each of the end-face walls 3 and 4 abuts the circumferential wall 2 in an axial contact. The circumferential wall 2 can advantageously be joined loosely, i.e. not in a material fit, to the end-face walls 3 and 4.

The rotor 10 is non-rotationally connected to a drive shaft 12. The drive shaft 12 penetrates the end-face wall 4 and the rotor 10 and protrudes into a blind bore in the end-face wall 3. A drive portion of the drive shaft 12 protrudes beyond the end-face wall 4 and can be rotary-driven in this drive portion. A drive wheel, for example a belt disc for a belt drive, a chain wheel for a chain drive or a toothed wheel for a toothed wheel drive, can be non-rotationally connected to the drive shaft 12 in the drive portion. The shaft passage of the end-face wall 4 is sealed off by means of a shaft gasket 4a.

As already mentioned, the components of the pre-assembled pump are joined loosely to each other. The circumferential wall 2 and the end-face walls 3 and 4 are held together in an axial layered assemblage within the pre-assembled pump unit by means of a holding device. The holding device comprises at least one holder 13: in the example embodiment, it comprises a first holder 13 and a second holder 13. The respective holder 13 protrudes from the second end-face wall 4 in the axial direction in the shape of a rod, protrudes through the circumferential wall 2 in the axial direction and protrudes through or into the first end-face wall 3. In the example embodiment, one of the holders 13 protrudes through the first end-face wall 3, while the other holder 13 protrudes into a blind bore in the end-face wall 3. The holders 13 can be fixedly connected to the second end-face wall 4 in a frictional or material fit. The holder 13 which protrudes through the first end-face wall 3 is in a holding engagement, which is based on a positive fit, with the first end-face wall 3. The holding engagement is such that the holder 13 in question can be guided through a passage in the end-face wall 3, as viewed from the end-face wall 4, but can no longer be retracted once it has been guided through, for example due to a retainer.

During pre-assembly, the circumferential wall 2 and the first end-face wall 3 are slid along the holders 13 towards the end-face wall 4 until one of the holders 13 protrudes through the end-face wall 3 and passes into holding engagement with it or can be moved into holding engagement with it by the retainer. The other holder 13 serves to correctly position the circumferential wall 2 and the end-face wall 3 in terms of their rotational angular position.

The bead gasket B is held on the pump housing 1 on the outer end-face side of the end-face wall 3. In order to center it, the bead gasket B comprises a central passage 35 (FIG. 8) which during pre-assembly is slid onto an axial projection 3a on the outer end-face side of the end-face wall 3. When the pump is pre-assembled, the spring device 40 is likewise held on the outer end-face side of the end-face wall 3. The pump housing 1 which is held together as a loose layered assemblage by means of the holders 13, together with the bead gasket B and the spring device 40, forms the pre-assembled pump unit in the form of an assembly unit which is simple to assemble as a whole. This assembly unit also comprises a first sealing ring 14a, which is accommodated in a circumferential groove on the outer circumference of the end-face wall 4, and a second sealing ring 14b which is accommodated in a circumferential groove on the outer circumference of the end-face wall 3. The sealing rings 14a and 14b serve to seal off a low-pressure space which surrounds the assembled pump on its outer circumference.

Figure 5:
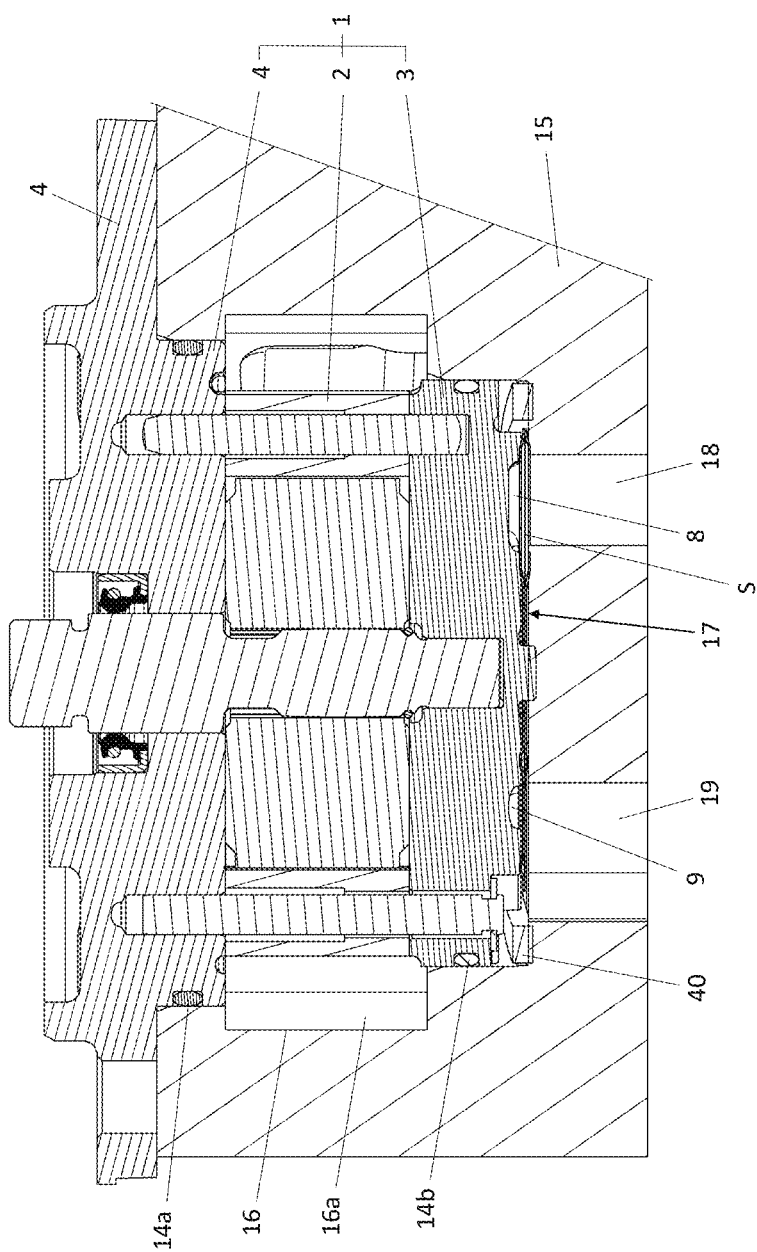
FIG. 5 an arrangement of the pump in an accommodating well of an accommodating device, in a longitudinal section.

FIG. 5 shows the pump assembled, wherein the pump itself is again shown in the section A-A from FIG. 3. The pump is arranged on an accommodating device 15. The pump is arranged in such a way that it protrudes into an accommodating well 16 of the accommodating device 15 with the bead gasket B first. The assembly flange of the end-face wall 4 of the pump abuts the accommodating device 15, and the pump is fastened on the accommodating device 15 in the region of the flange, for example by means of a screw connection.

The pump protrudes into the accommodating well 16 with its port side first, such that the outer end-face side of the end-face wall 3 lies opposite a base 17 of the accommodating well 16 at a slight axial distance, i.e. across an axial joint.

When the pump is assembled, the spring device 40 is axially supported on the base 17 of the well, and its spring force acts axially on the end-face wall 3. In this way, the spring force of the spring device 40 presses the end-face wall 3 against the circumferential wall 2 and presses the circumferential wall 2 against the end-face wall 4, thus obtaining an axially sealed and fixed assemblage of the end-face walls 3 and 4 and circumferential wall 2 and ensuring that the delivery chamber 5 (FIG. 1) is sealed off.

A low-pressure space 16a which is formed on the outer circumference of the pump housing 1 is delineated on its radially outer side by an inner circumferential wall of the accommodating well 16 and axially by the sealing rings 14a and 14b. When the pump is in operation, the fluid passes into the delivery chamber 5 (FIG. 1) via the low-pressure space 16a and the inlets 6 and 7 (FIGS. 1 and 2) which emerge in the low-pressure space 16a. A first pressure port 18 and a second pressure port 19, via which the fluid can be discharged in the axial direction, emerge at the base 17 of the well on the high-pressure side of the pump. As has already been described on the basis of FIG. 1, the fluid is discharged in the region of the first working flux via a first pressure outlet which leads through the end-face wall 3, and in the region of the second working flux via a second pressure outlet which likewise leads through the end-face wall 3. The connecting channels 8 and 9 which can be seen in FIG. 1 emerge into the assigned pressure outlets: the connecting channel 8 into the first pressure outlet, and the connecting channel 9 into the second pressure outlet. The first pressure outlet is therefore referred to in the following as the pressure outlet 8, and the second pressure outlet is therefore referred to in the following as the pressure outlet 9. The pressure outlets 8 and 9 extend axially through the end-face wall 3 and each emerge in a recess on the outer end-face side of the end-face wall 3. These recesses can be seen in FIG. 5 and are likewise referred to here as the first pressure outlet 8 and the second pressure outlet 9. The first pressure outlet 8 of the pump lies axially opposite the first pressure port 18. The second pressure outlet 9 of the pump lies opposite the second pressure port 19. When the pump is in operation, the fluid of the first working flux is discharged via the first pressure outlet 8 and the first pressure port 18. The fluid of the second working flux is discharged via the second pressure outlet 9 and the second pressure port 19.

The outlet gasket B is arranged in the axial joint remaining between the end-face wall 3 and the base 17 of the well and separates the first pressure outlet 8 and first pressure port 18 from the second pressure outlet 9 and second pressure port 19.

Figure 8:
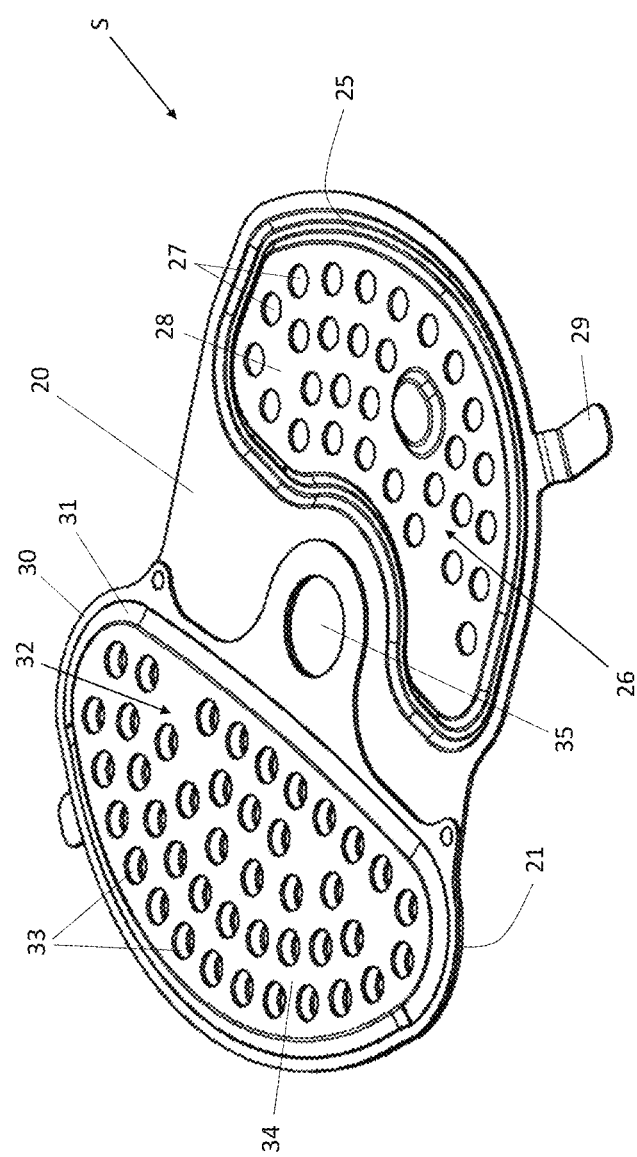
FIG. 8 the bead gasket in an isometric representation.
Figure 9:
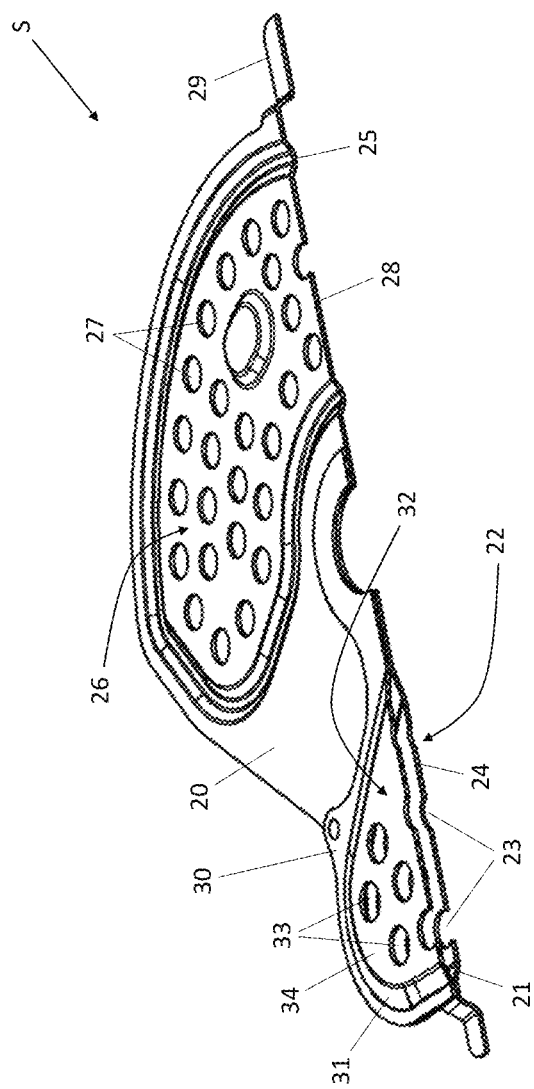
FIG. 9 the bead gasket in a longitudinal section, in an isometric representation.

FIGS. 6 to 9 show the bead gasket B itself, separate from the pump. FIG. 6 is a longitudinal section extending through the central passage 35 of the bead gasket B which serves the purpose of mounting it on the end-face wall 3. FIG. 7 is an enlarged representation of a partial region of the longitudinal section from FIG. 6. FIG. 8 is an isometric view onto the outer side of the bead gasket B which points away from the end-face wall 3 when the pump is pre-assembled and when the pump is assembled. FIG. 9 likewise shows the bead gasket B in an isometric view, but in a longitudinal section.

The bead gasket B comprises a first bead loop 21 which surrounds a first inner region 22. The bead loop 21 is a smallest bead loop in relation to the inner region 22 and encloses, i.e. completely surrounds, the inner region 22 in an axial plan view. The bead loop 21 is a half-bead, as can be seen in particular in FIG. 7, but also in the complete longitudinal section from FIG. 6 and in FIG. 9.

The first bead loop 21 is rigidified in the inner region 22 as compared to conventional bead loops. It is rigidified by means of a first rigidifying structure 24 which extends circumferentially from the inner edge of the bead loop 21 into the inner region 22. The rigidifying structure 24 is shaped as a planar, thin disc. It comprises a plurality of passages 23 which are arranged next to each other and through which the fluid can flow when the pump is in operation. The rigidifying structure 24 extends along the entire inner circumference of the bead loop 21 and uniformly rigidifies the bead loop 21 radially inwards over the entire inner circumference. The passages 23 are circular passage bores, but can also in principle have other cross-sectional shapes in modifications and can for example be elongated, straight or curved slots.

The bead gasket B also comprises the additional, second bead loop 25 which can already be seen in FIGS. 2 and 3 and which surrounds the second inner region 26 in the axial view. The bead loop 25 forms a smallest bead loop in relation to the inner region 26 and encloses, i.e. completely surrounds, the inner region 26 in the axial view. The second bead loop 25 is a full bead. The bead loop 25 is again rigidified in its inner region 26. A second rigidifying structure 28, which like the first rigidifying structure 24 is shaped as a planar, thin disc, serves the purpose of rigidifying it. As can best be seen in FIGS. 8 and 9, the rigidifying structure 28 again extends uniformly over the entire inner circumference of the bead loop 25 in order to uniformly rigidify it radially inwards over the inner circumference. Like the first rigidifying structure 24, the second rigidifying structure 28 is again provided with a plurality of passages 27, which are arranged next to each other, for the fluid delivered by the pump. The passages 27 are likewise shaped as circular passage bores, but can also have other cross-sectional shapes in modifications and can for example be shaped as elongated linear slots or elongated curved slots.

The first bead loop 21 and the second bead loop 25 are arranged next to each other in the axial view, such that the corresponding inner regions 22 and 26 are also arranged next to each other and at a distance from each other. In the example embodiment, the bead loops 21 and 25 also extend separately at a distance from each other. The central passage 35, which serves to center the bead gasket B on the pump housing 1, is for example situated between the bead loops 21 and 25.

The bead gasket B also comprises the additional, third bead loop 31 which can already be seen in FIGS. 2 and 3 and which surrounds the additional, third inner region 32. The bead loop 31 is a smallest bead loop in relation to the inner region 32 and encloses, i.e. completely surrounds, the inner region 32 in the axial view. Like the bead loop 21, the bead loop 31 is rigidified radially inwards. A third rigidifying structure 34, which is shaped as a planar, thin disc, serves the purpose of rigidifying it. The third rigidifying structure 34 corresponds to the first rigidifying structure 24 and, like the first rigidifying structure 24, comprises passages 33 for the fluid. The statements made with respect to the passages 23 apply analogously to the passages 33. The passages 33 are axially flush with the passages 23, such that the fluid can flow through the bead gasket B in the axial direction by the shortest route in the region of the two inner regions 22 and 32. In modifications, the passages 33 can however also be offset in the radial direction with respect to the passages 23, in order to increase the flow resistance for the fluid, with the shape and number of the passages 22 and 33 being otherwise identical.

In the example embodiment, not only the first inner region 22 and third inner region 32 but also the first bead loop 21 and third bead loop 31 overlap, over their entire profile, in the axial view. Like the first bead loop 21, the third bead loop 31 is shaped as a half-bead. Starting from their outer circumference, the bead loops 21 and 31 splay away from each other in the axial direction towards the inner regions 22 and 32, thus increasing the axial spring displacement of the bead gasket B in the region of the bead loops 21 and 31 as compared to the respective individual bead 21 and 31. Increasing the axial spring displacement is advantageous with regard to compensating, as is desired, for variations in the axial width of the joint which is to be sealed off.

The bead gasket B is multi-layered. It comprises a first gasket layer 20 and a second gasket layer 30. The first bead loop 21 and the first rigidifying structure 24 are part of the first gasket layer 20. The second gasket layer 30 forms the third bead loop 31 and the third rigidifying structure 34. The gasket layers 20 and 30 lie one immediately on top of the other. They can advantageously be joined to each other in a material fit, for example by means of a welding or soldering or adhesive connection.

The first gasket layer 20 also forms the second bead loop 25 and its rigidifying structure 28.

The gasket layers 20 and 30 are metal sheet structures. They can in particular be sheet-steel structures and preferably spring-steel structures. In principle, however, the sheet structures can also be plastic structures, for example so-called organic sheet structures. Sheet steel is however preferred.

The outer circumference of the bead gasket B comprises tongues 29 which protrude outwards and serve to position the bead gasket B relative to the pump housing 1 and which co-operate with corresponding positioning elements on the pump housing 1, for example axial protrusions on the end-face wall 3. The tongues 29 can form a fitted assemblage with the end-face wall 3 or can engage the end-face wall 3 in a positive fit, preferably with no frictional fit. Additionally, the tongues 29 also serve to mount the bead gasket B on the pump housing 1. To this end, the tongues 29 can for example be screwed, soldered, welded, glued, etc. to the end-face wall 3. In the example embodiment, however, the tongues 29 grip behind the spring device 40, such that the bead gasket B is held on the pump housing 1, centered and positioned, when gripping behind the spring device 40.

Figure 10:
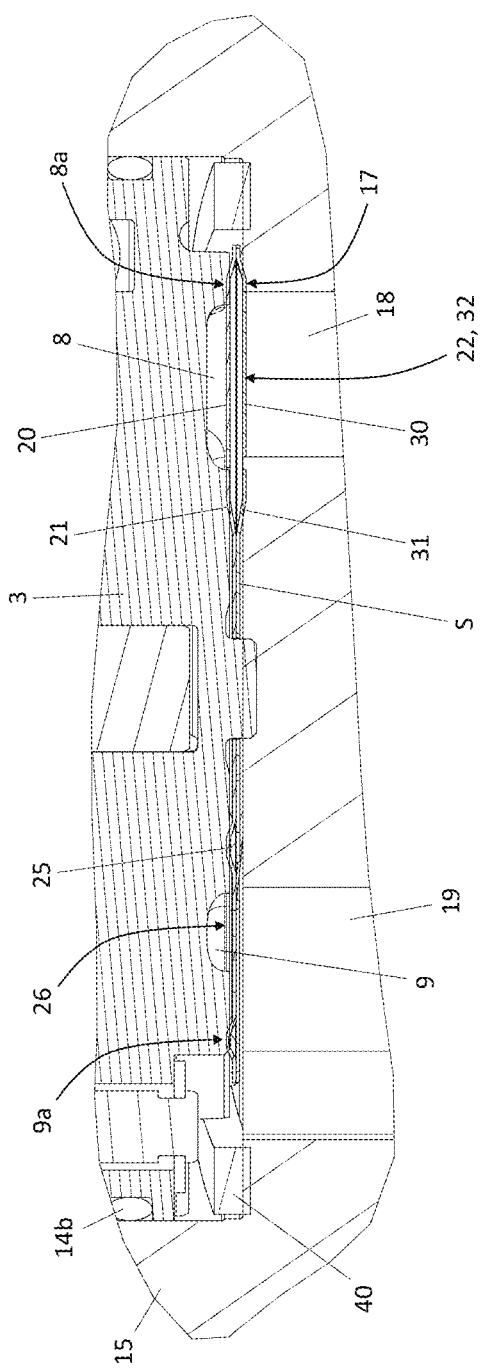
FIG. 10 the axial joint between the pump and the accommodating device, which is sealed off by means of the bead gasket, in an enlarged representation.

FIG. 10 shows an enlarged representation of the region of the axial joint between the end-face wall 3 and the base 17 of the well. The bead gasket B is arranged in the joint and separates the first pressure outlet 8 and first pressure port 18 from the second pressure outlet 9 and second pressure port 19. The first bead loop 21 encloses the first pressure outlet 8 in a fluid seal. The third bead loop 31 encloses the first pressure port 18 in a fluid seal. In the example embodiment, the first pressure outlet 8 emerges in a recess on the outer end-face side of the end-face wall 3, as already mentioned. This recess is assigned to the first pressure outlet 8 and is therefore likewise denoted by the reference sign 8. The first bead loop 21 encloses the recess of the first pressure outlet 8 in a fluid seal. In order to seal it off, the first bead loop 21 abuts a circumferential edge 8a of the recess, i.e. a circumferential edge of the first pressure outlet 8, in a seal. The circumferential edge 8a encloses the first pressure outlet 8: in the example embodiment, it encloses the recess of the first pressure outlet 8 on the outer end-face side of the end-face wall 3 on which the pressure outlet 8 emerges. The third bead loop 31 abuts the circumferential edge of the first pressure port 18, which is formed by the base 17 of the well, in a seal. The bead loops 21 and 31 each press against the assigned circumferential edge 8a and 17 with an axial spring force.

The bead gasket B is advantageously installed with an axial biasing force. The biasing force is expediently selected such that it ensures a spring force which is sufficient for creating a seal under all installation conditions, i.e. in relation to the unavoidable component tolerances and installation tolerances and also in relation to the variations in the axial width of the joint associated with changes in temperature and/or pressure. In advantageous embodiments, the bead gasket B is designed in the region of the bead loops 21 and 31 such that it can compensate for variations in the axial joint width of at least 0.1 mm or at least 0.2 mm and preferably 0.3 mm or more, i.e. such that it ensures a sufficient seal across the respective range of variation in the axial joint width.

The second bead loop 25 can be configured such that it abuts a circumferential edge 9*a*, which surrounds the second pressure outlet 9, in a seal and simultaneously abuts the axially opposite base 17 of the well, where it surrounds the second pressure port 19, in a seal. In the example embodiment, however, the second bead loop 25 only abuts the outer end-face side of the end-face wall 3, i.e. the circumferential edge 9*a* mentioned, with a certain biasing force when the pump is assembled, and has no contact or at least no sealing contact with the base 17 of the well. It is advantageous if the bead gasket B presses against the circumferential edge 9*a* on the outer end-face side of the end-face wall 3 with a certain axial biasing force when the pump is assembled. The separation from the first pressure outlet 8 and first pressure port 18 is maintained by the first bead loop 21 and third bead loop 31. The separation from the low-pressure side of the pump, in particular from the low-pressure space 16*a* (FIG. 5), is ensured by the sealing ring 14*b*.

The inner regions 22 and 32 of the bead gasket B lie axially opposite the first pressure outlet 8 and first pressure port 18, and the inner region 26 of the bead gasket B lies axially opposite the second pressure outlet 9 and second pressure port 19. The inner regions 22 and 32 overlap the first pressure outlet 8 and first pressure port 18. The inner region 26 overlaps the second pressure outlet 9 and second pressure port 19. As is preferred, the inner regions 22 and 32 overlap the recess towards which the pressure outlet 8 on the outer end-face side of the end-face wall 3 widens. As is preferred, the inner region 26 overlaps the recess towards which the pressure outlet 9 on the outer end-face side of the end-face wall 3 widens. When the pump is in operation, the fluid is delivered through the pressure outlets 8 and 9 and dispersed over the inner regions 22, 32 and 26, which are enclosed by the bead loops 21, 31 and 25, in the region of the respectively assigned recess. The pressurized fluid then flows through the local passages 23, 33 and 27 (FIG. 9) provided in the respective rigidifying structure 24, 34 and 28 and is discharged via the respectively adjoining pressure port 18 and 19. The passages of the rigidifying structures ensure that the flow is evened out, and in particular that pressure spikes during cold operations are relieved and correspondingly viscous fluid is avoided. The rigidifying structures provide a flow resistance, so that the sub-vane grooves are quickly supplied with the pressure fluid during a cold start.

The bead gasket B can be subjected to an axial biasing force when the pump is initially assembled, such that it is elastically spring-deflected axially and exerts an axial spring force, corresponding to the biasing force, on the pump housing 1.

The bead gasket B can be arranged in an indirect line of force to a restoring device. The restoring device preferably absorbs the majority of the axial force which acts via the joint when the joint width is reduced. The bead gasket B can in particular be arranged in the indirect line of force to an axially acting spring device. In the example embodiment, the bead gasket B is arranged in an indirect line of force to the spring device 40. Alternatively, however, the bead gasket B can also be arranged in a direct line of force and solely exert an axial spring force on the pump housing 1, i.e. perform the function of the spring device 40 and replace it.

In the force/displacement diagram in FIG. 11, the rigidified bead gasket B is contrasted with a non-rigidified bead gasket (the reference gasket). $F_1$ denotes the displacement-dependent force profile of the bead gasket B in the region of the first bead loop 21 and third bead loop 31. $F_2$ denotes the displacement-dependent force profile of the reference gasket. The reference gasket corresponds to the bead gasket B in terms of the bead loops 21, 25 and 31 themselves, but does not comprise any rigidifying structure which protrudes into the flow cross-section of the fluid when the pump is pre-assembled or assembled and which therefore protrudes into the fluid, which flows onto it, when the pump is in operation. It is assumed in the diagram that the respective bead gasket is not exposed to a load, i.e. that no force other than gravity is acting on it, in its initial state.

The reference gasket counters an axial spring-deflection over a range of a few tenths of a millimeter with a comparatively small spring force and in practice buckles abruptly when its axial width is reduced by a particular amount. The rigidified bead gasket B, by contrast, can be installed with an axial biasing force which is at least as large as a minimum spring force necessary in order to ensure that a seal is created and larger than the spring force at which the reference gasket buckles. The minimum spring force is expediently related to a maximum axial joint width which can be established by the installation tolerances and operational conditions. Variations in the joint width which occur during operations due to changes in temperature and pressure pulses are however significantly smaller than the variations caused by the tolerance chains from pump to pump. The biasing force guarantees that at least the minimum spring force acts on the bead loops 21 and 31 at the maximum joint width. The biasing force is advantageously selected such that the pitch of the force-over-displacement curve is smaller than 45° or smaller than 30°. On the basis of the biasing force, the rigidified bead gasket B exhibits a comparatively large range within which the axial joint width can vary while the bead gasket B nonetheless does not lose its spring action, i.e. is at most insubstantially plastically deformed, and always presses against the circumferential edge which is to be respectively sealed off—in the example embodiment, the circumferential edge 9*a* and the base 17 of the well (FIG. 10)—with a sufficient spring force.

The invention claimed is:

1. A rotary pump for applying a pressure liquid to an assembly, the pump comprising:
   (a) a pump housing featuring: a circumferential wall, which surrounds a delivery chamber of the pump; and a first end-face wall and second end-face wall which axially delineate the delivery chamber on its two end-face sides;
   (b) an inlet for the liquid on a low-pressure side of the pump housing and an outlet through which liquid on a high-pressure side of the pump housing can be delivered out of the delivery chamber;
   (c) a delivery member comprising a rotor, which can be rotationally moved in the delivery chamber, for delivering the liquid from the low-pressure side to the high-pressure side and through an outlet of the pump; and
   (d) a metal bead gasket comprising (i) a first bead loop which surrounds a first inner region of the bead gasket, through which the liquid can axially flow, and follows a contour of the outlet in an axial contact on the end-face side with respect to the first bead loop, in order to seal it off, in an axial view onto the bead gasket, (ii) a second bead loop which surrounds a second inner region located next to the first inner region in the axial view and comprises a bead end face for an axial contact with the first end-face wall, and (iii) a passage for liquid which is located in the second inner region,
(e) wherein the outlet emerges on an outer end-face side of the first end-face wall which faces away from the delivery chamber, and the bead gasket is held on the pump housing such that it axially faces the outer end-face side of the first end-face wall, to seal off the outlet.

2. The pump according to claim 1, wherein
the bead gasket comprises a third bead loop which surrounds a third inner region of the bead gasket, through which the liquid can flow, in the axial view, wherein
the first inner region and the third inner region overlap in the axial view, and
an outer bead end face of the first bead loop which surrounds the outlet axially faces the pump housing and faces axially away from an outer bead end face of the third bead loop.

3. The pump according to claim 1, wherein the pump is arranged on an accommodating device, the accommodating device comprises an end-face wall, which lies axially opposite the outlet and comprises a pressure port, and a third bead loop surrounds the pressure port in axial contact with the end-face wall of the accommodating device, such that the outlet is connected to the pressure port in a liquid seal.

4. The pump according to claim 1, wherein when the pump is assembled, the bead gasket exerts an axial spring force on the pump housing via the first bead loop either in an indirect line of force to a spring device or in a direct line of force.

5. The pump according to claim 1, wherein the pump is a gear pump and/or a lubricant pump and/or coolant pump or a vacuum pump for a motor vehicle or a gear pump for a device for generating energy, for example a wind turbine.

6. The pump according to claim 1, wherein the bead gasket is held on the pump housing such that it abuts the outer end-face side of the first end-face wall in axial contact, to seal off the outlet.

7. The pump according to claim 1, wherein the bead gasket comprises a passage for liquid which is located in the first inner region, and wherein the first bead loop is a smallest bead loop surrounding the passage.

8. The pump according to claim 1, wherein the bead gasket comprises a first rigidifying structure which extends from the first bead loop into the first inner region in the axial view in order to rigidify the first bead loop.

9. The pump according to claim 8, wherein the first rigidifying structure is disc-shaped or bowl-shaped.

10. The pump according to claim 8, wherein the first rigidifying structure comprises multiple passages, which are separated from each other and jointly surrounded by the assigned bead loop, next to each other in an axial plan view.

11. The pump according to claim 8, wherein the first rigidifying structure extends over at least the majority of the inner circumference of the corresponding bead loop over a breadth, being a radial breadth in the axial view, which corresponds at least to the radial breadth of the corresponding bead loop.

12. The pump according claim 1, further comprising a second rigidifying structure which extends from the second bead loop into the second inner region in order to rigidify the second bead loop.

13. The pump according to claim 12, wherein the second rigidifying structure is disc-shaped or bowl-shaped and/or wherein the second rigidifying structure comprises multiple passages, which are separated from each other and jointly surrounded by the assigned bead loop, next to each other in an axial plan view.

14. The pump according to claim 1, the bead gasket comprising a third bead loop which surrounds a third inner region comprising a passage for the liquid in the axial view and comprises a bead end face for an axial contact with an end-face wall of an accommodating device, wherein
the first bead loop and the third bead loop are arranged axially one above the other,
the first inner region and the third inner region overlap in the axial view, and
the bead end face of the first bead loop faces axially away from the bead end face of the third bead loop.

15. The pump according to claim 14, the bead gasket comprising a third rigidifying structure which extends from the third bead loop into the third inner region in order to rigidify the third bead loop.

16. The pump according to claim 15, wherein the third rigidifying structure is disc-shaped or bowl-shaped and/or wherein the third rigidifying structure comprises multiple passages, which are separated from each other and jointly surrounded by the assigned bead loop, next to each other in an axial plan view.

17. The pump according to claim 14, wherein the first bead loop and the third bead loop splay axially away from each other towards the respective first inner region or third inner region and a respective bead end face of the first bead loop or the third bead loop, such that an elongated axial spring displacement is obtained between these bead end faces.

18. The pump according to claim 1, the bead gasket comprising:
a first gasket layer which comprises the first bead loop and the first inner region; and
a second gasket layer comprising a third bead loop which surrounds a third inner region in which a passage for the liquid is located,
wherein
the first gasket layer and the second gasket layer lie axially one above the other,
the third bead loop comprises a bead end face for an axial contact with an end-face wall of an accommodating device, wherein said bead end face faces axially away from the bead end face of the first bead loop, and
the first inner region and the third inner region overlap in the axial view.

19. The pump according to claim 1, the bead gasket comprising:
a first gasket layer which comprises the first bead loop and the first inner region; and
a second gasket layer comprising a third bead loop which surrounds a third inner region in which a passage for the liquid is located,
wherein
the first gasket layer and the second gasket layer lie axially one above the other,
the third bead loop comprises a bead end face for an axial contact with an end-face wall of an accommodating device, wherein said bead end face faces axially away from the bead end face of the first bead loop, and
the first inner region and the third inner region overlap in the axial view,
wherein the first gasket layer comprises the second bead loop and the second inner region.

20. A rotary pump for applying a pressure liquid to an assembly, the pump comprising:

(a) a pump housing featuring: a circumferential wall, which surrounds a delivery chamber of the pump; and a first end-face wall and second end-face wall which axially delineate the delivery chamber on its two end-face sides;
(b) an inlet for the liquid on a low-pressure side of the pump housing and an outlet through which liquid on a high-pressure side of the pump housing can be delivered out of the delivery chamber;
(c) a delivery member comprising a rotor, which can be rotationally moved in the delivery chamber, for delivering the liquid from the low-pressure side to the high-pressure side and through an outlet of the pump; and
(d) a metal bead gasket comprising a first bead loop which surrounds a first inner region of the bead gasket, through which the liquid can axially flow, and follows a contour of the outlet in an axial contact on the end-face side with respect to the first bead loop, in order to seal it off, in an axial view onto the bead gasket,
(e) wherein the outlet emerges on an outer end-face side of the first end-face wall which faces away from the delivery chamber, and the bead gasket is held on the pump housing such that it axially faces the outer end-face side of the first end-face wall, to seal off the outlet, and
(f) wherein the bead gasket comprises
a passage for liquid which is located in the first inner region,
wherein the first bead loop is a smallest bead loop surrounding the passage; and
a first rigidifying structure which extends from the first bead loop into the first inner region in the axial view in order to rigidify the first bead loop,
wherein the first rigidifying structure which seals off the outlet overlaps with the outlet in the axial view, and the first rigidifying structure which seals off the delivery chamber overlaps with the delivery chamber in the axial view, such that the liquid flows onto the first rigidifying structure when the pump is in operation.

* * * * *